United States Patent
Robinson

[11] Patent Number: 6,137,941
[45] Date of Patent: Oct. 24, 2000

[54] VARIABLE OPTICAL ATTENUATOR

[75] Inventor: Kevin Cyrus Robinson, Zionsville, Pa.

[73] Assignee: Lucent Technologies, Inc., Murray Hill, N.J.

[21] Appl. No.: 09/146,446

[22] Filed: Sep. 3, 1998

[51] Int. Cl.$^7$ .................................................... G02B 6/26
[52] U.S. Cl. ............................... 385/140; 385/33; 385/25
[58] Field of Search .............................. 385/140, 25, 33, 385/34, 35, 18, 23

[56] References Cited

U.S. PATENT DOCUMENTS

| | | | |
|---|---|---|---|
| 4,192,573 | 3/1980 | Brown, Jr. ................................. | 350/55 |
| 4,198,118 | 4/1980 | Porter ..................................... | 350/96.16 |
| 4,498,730 | 2/1985 | Tanaka ................................... | 350/96.16 |
| 5,900,983 | 5/1999 | Ford et al. .............................. | 385/140 |
| 5,915,063 | 6/1999 | Colbourne et al. ..................... | 385/140 |

OTHER PUBLICATIONS

D. W. Monk, R.O. Gale, Article from Microelectronic Engineering 27, 1995, pp. 489–493.

MEMS Technology Applications Center, Overview, Last Modified Oct. 1, 1997.

*Primary Examiner*—Hung N. Ngo
*Attorney, Agent, or Firm*—Duane Morris & Heckscher LLP; Steven E. Koffs

[57] ABSTRACT

A variable optical attenuator includes a lens, first and second optical waveguides, and a semiconductor micro-electro-mechanical device positioned on a side of the lens opposite the first and second optical waveguides. The semiconductor micro-electro-mechanical device may be, for example, a digital micromirror device or a silicon micro-electro-mechanical system. The device has a reflecting surface. The reflecting surface has a normal position in which light from the first waveguide reflects off of the reflecting surface and passes through the lens into the second waveguide. The reflecting surface has a plurality of respectively different attenuating positions in which light from the first waveguide reflects off of the reflecting surface and passes through the lens, but an amount of light entering the second optical waveguide is attenuated by respectively different amounts corresponding to the respectively different positions. By pivoting the reflecting surface about 0.35 degrees or less from the normal position, 40 dB of attenuation are obtained relative to the normal position. The optical attenuator can achieve about 25 dB of attenuation using a 5 Volt power supply.

13 Claims, 3 Drawing Sheets

VARIABLE OPTICAL ATTENUATOR

FIELD OF THE INVENTION

The present invention relates to the field of optics generally, and more specifically to optical attenuators.

DESCRIPTION OF THE RELATED ART

High intensity, coherent light beams are used as an increasingly common means of transmitting data. Optical fibers provide higher data rates with lower cost, weight and volume per unit of length than cables relying on metallic conductors.

A variety of devices are known for controlling the light beam. One of these is the optical attenuator.

An exemplary optical attenuator is described and shown in U.S. Pat. No. 4,192,573 to Brown, Jr. et al. A flat mirror reflects an input beam of light. A focusing mirror receives the beam of light reflected from the flat mirror. The focusing mirror is fixed relative to the flat mirror, so that the axis of the beam of light reflected by the focusing mirror is offset from and, parallel to, the axis of the input beam of light. A pinhole assembly receives the beam of light reflected from the focusing mirror. The pinhole assembly has a pinhole positioned on the axis of the beam of light reflected by the focusing mirror. A servo-motor actuates the flat mirror and the focusing mirror, in unison, relative to the pinhole assembly in a direction parallel to the axis of the input beam of light. The parallel movement of the mirrors acts to vary the proportion of the input beam of light that passes through the pinhole. The servo mechanism is bulky and requires a relatively long period of time to move the mirrors relative to the pinhole assembly.

SUMMARY OF THE INVENTION

The present invention is a variable optical attenuator which has a semiconductor micro-electro-mechanical device for positioning a reflecting surface in any of a plurality of positions, each providing a respectively different amount of attenuation.

The variable optical attenuator includes a lens, a first optical waveguide, and a second optical waveguide. A semiconductor micro-electro-mechanical device is positioned on a side of the lens opposite the first and second optical waveguides. The device has a reflecting surface. The reflecting surface has a normal position in which light from the first waveguide reflects off of the reflecting surface and passes through the lens into the second waveguide. The reflecting surface has a plurality of respectively different attenuating positions in which light from the first waveguide reflects off of the reflecting surface and passes through the lens, but an amount of light entering the second optical waveguide is attenuated by respectively different amounts corresponding to the respectively different positions.

According to a further aspect of the invention, a method for controlling a beam of light includes providing a lens, first and second optical waveguides, and a semiconductor micro-electro-mechanical device positioned on a side of the lens opposite the first and second optical waveguides. The device having a reflecting surface. The reflecting surface is pivoted to a normal position in which light from the first waveguide reflects off of the reflecting surface and passes through the lens into the second waveguide. The reflecting surface is pivoted to a plurality of respectively different attenuating positions in which light from the first waveguide reflects off of the reflecting surface and passes through the lens, but an amount of light entering the second optical waveguide is attenuated by respectively different amounts corresponding to the respectively different positions.

DETAILED DESCRIPTION

Figure 1:
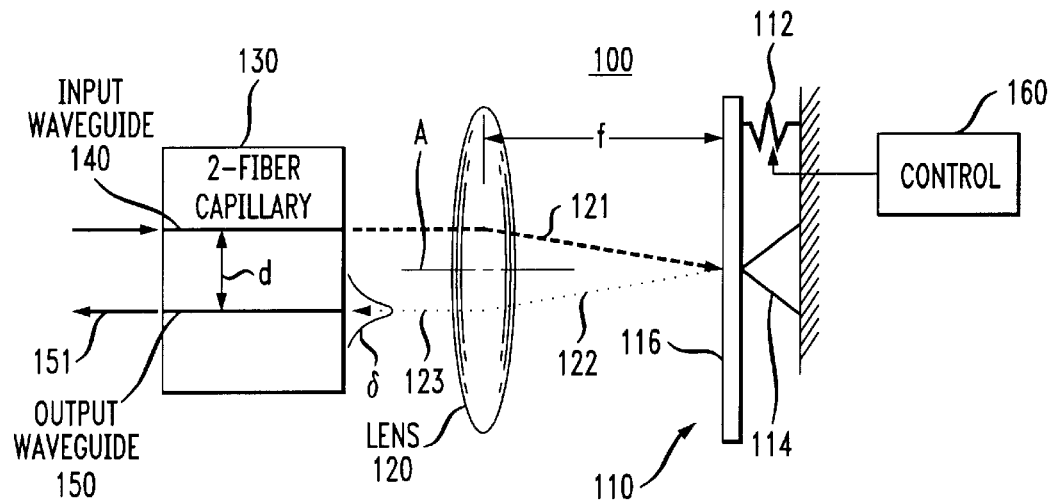
FIG. 1 is a schematic diagram of an exemplary variable optical attenuator according to the present invention, in a non-attenuating state.

The present invention is a variable optical attenuator. An example is shown in FIG. 1. A lens 120 is provided. Means are provided for transmitting light to the lens 120 and for receiving light from the lens 120. The light transmitting means and light receiving means may be, for example, a pair of optical waveguides 140 and 150. A reflecting surface 116 may be a mirror. A pivoting means 112 is provided for pivotally supporting the reflecting surface 116. The reflecting surface 116 has a normal position (FIG. 1) in which light 121 from the transmitting means 140 reflects off of the reflecting surface 116 as a reflected beam 122 and passes through the lens 120 into the receiving means 150 with low loss in the output beam 123. The pivoting means 112 can pivot the reflecting surface 116 to a plurality of respectively different attenuating positions (FIGS. 2A and 2B) in which light 121 from the transmitting means 140 reflects off of the reflecting surface 116 as a reflected beam 122 and passes through the lens 120, but an amount of light 123 entering the receiving means 150 is attenuated by respectively different amounts corresponding to the respectively different positions.

FIG. 1 shows an exemplary variable optical attenuator according to the invention. The lens 120 may have, for example, a focal length f of 2.0 millimeters (mm). The exemplary lens 120 has an axis A which is parallel to the first (input) optical waveguide 140 and the second (output) optical waveguide 150.

A 2-fiber capillary 130 houses the optical waveguides 140 and 150. The optical waveguides 140 and 150 may be, for example, optical fibers having 10 $\mu$m core diameter and a center-to-center spacing d of 125 $\mu$m. The optical waveguides may be formed of a conventional optical fiber composition. One of ordinary skill recognizes that other types of optical waveguides, such as light conducting semiconductor devices, may be used.

The reflecting surface 116 should be large enough to intercept the entire beam 121 at all of the pivot angles contemplated for the reflecting surface during use. For example, with a fiber core diameter of 10 $\mu$m, a focal length f of 2.0 mm, and the input waveguide 140 and output waveguide 150 separated by 125 $\mu$m, the reflecting surface 116 should be large enough to intercept a beam 121 having a diameter of 500 to 750 $\mu$m (i.e., 0.5 to 0.75 mm).

Given the above values for f, d and the core diameter of the fiber 140, the beam 123 leaving the lens 120 and impinging on the 2-fiber capillary 130 has a beam diameter of about 400 μm. One of ordinary skill in the art recognizes that δ represents the intensity function of the light beam 123, at any radial distance from the center of the beam.

A semiconductor micro-electro-mechanical device 110 or system is positioned on a side of the lens 120 opposite the first and second optical waveguides 140 and 150. The device 110 has a reflecting surface 116, which pivots about a support 114. Microelectromechanical Systems, or MEMS, are integrated micro devices or systems combining electrical and mechanical components. They are fabricated using integrated circuit (IC) batch processing techniques and can range in size from micrometers to millimeters. These systems can sense, control and actuate on the micro scale, and function individually or in arrays to generate effects on the macro scale.

The reflecting surface 116 has a normal position (shown in FIG. 1) in which light from the input waveguide 140 reflects off of the reflecting surface 116, and passes through the lens 120 into the output waveguide 150.

Figure 2A:
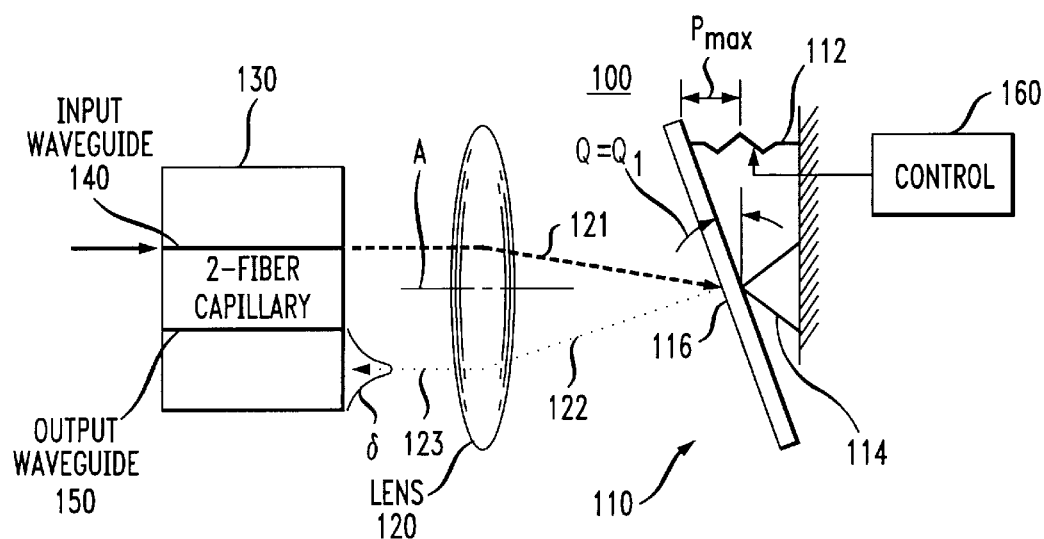
FIG. 2A shows the variable optical attenuator of FIG. 1, in a light-attenuating state.
Figure 2B:
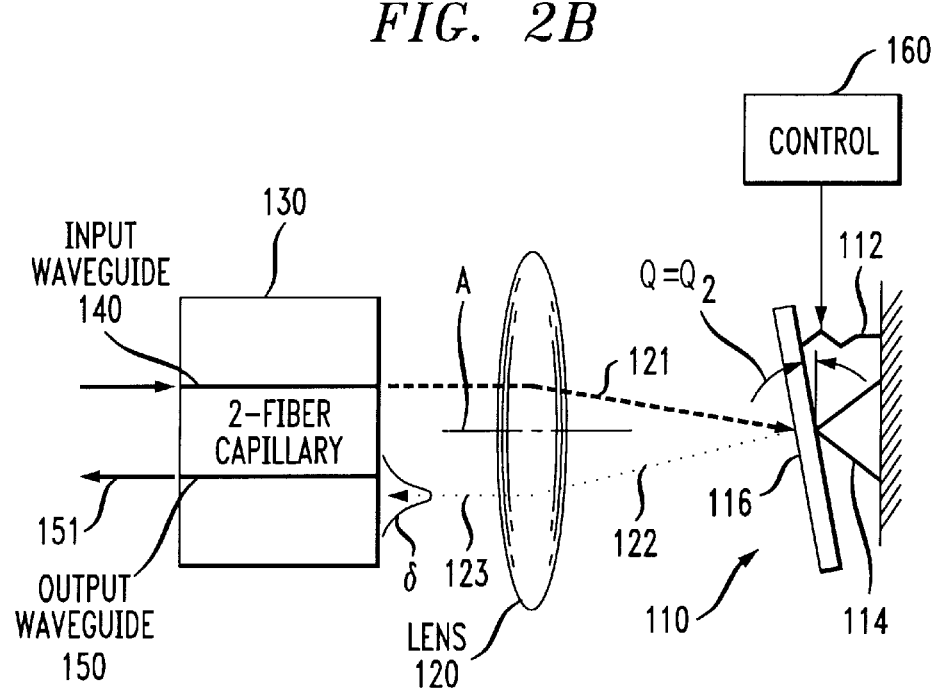
FIG. 2B shows the variable optical attenuator of FIG. 1, in a second light-attenuating state.

The reflecting surface 116 has a plurality of respectively different attenuating positions (for example, as shown in FIGS. 2A and 2B), in which light from the input waveguide 140 reflects off of the reflecting surface 116 and passes through the lens 120, but an amount of light entering the output optical waveguide 150 is attenuated by respectively different amounts corresponding to the respectively different positions. The angular displacement of the reflecting surface is measured by the angle θ, as shown in FIGS. 2A and 2B.

As the center of the beam 123 is moved away from the central axis of output waveguide 150, the amount of light entering output waveguide 150 is attenuated. The amount of attenuation depends on the distance between the center of the beam 123 and the center of the output waveguide 150. In FIG. 1, the center of the beam 123 is aligned with the output waveguide 150 when the reflecting surface 116 is normal to the axis A of lens 120. In FIG. 2A, the reflecting surface 116 is pivoted by an angle $\theta=\theta_1$ that is sufficient so that about 40 decibels (dB) of attenuation are produced. In FIG. 2B, the reflecting surface 116 is pivoted by a smaller angle $\theta=\theta_2 (0 \leq \theta_2 \leq \theta_1)$ that is sufficient so that about 20–25 dB of attenuation are produced. Although FIGS. 2A and 2B show only two different positions, one of ordinary skill recognizes that any desired number of different attenuation levels may be obtained by positioning the reflecting surface at respectively different pivot angles.

The inventor has determined that a very small angle θ is sufficient to produce any amount of attenuation required. For example, with a fiber core diameter of 10 μm, a focal length f of 2.0 mm, and the input waveguide 140 and output waveguide 150 separated by 125 μm, 40 dB of attenuation are produced by pivoting the reflecting surface about 0.35 degrees or less from the normal position of FIG. 1. This large attenuation with small deflection angle is due to the highly discriminating optical coupling characteristics of single-mode optical fiber. With the same configuration, 20 dB of attenuation are produced by pivoting the reflecting surface about 0.1 degree from the normal position.

Given an angle of 0.35 degrees or less, and a reflecting surface diameter 750 μm, the necessary pivot $P_{max}$ (shown in FIG. 2A) for the outer edge of the reflecting surface 116 would only be about 2.3 μm.

Because a very small angle θ and displacement $P_{max}$ are sufficient to provide a desired attenuation, the reflecting surface 116 and the pivoting means 112 may be provided by a semiconductor micro-electro-mechanical device 110, which may be for example, a silicon micro-electro-mechanical device. The semiconductor micro-electro-mechanical device 110 may be, for example, a digital micromirror device (DMD) or a silicon micro-electro-mechanical system. A DMD 110 may include either a piezoelectric element (represented by reference numeral 112 in FIGS. 1, 2A and 2B), or an electrostatic element, for pivoting the reflecting surface 116.

DMD's are described, for example, in Monk, David and Gale, Richard, "The Digital Micromirror Device for Projection Display", Microelectronic engineering, Vol. 27 pp 489–493 (1995), which is expressly incorporated by reference herein in its entirety.

Until the present invention by the inventor of this application, DMD's were primarily considered for display applications. Further, in displays, DMD's typically used large mirror reflecting angles of about 10 degrees.

Semiconductor micro-electro-mechanical devices are advantageous because they can be driven by low voltages, and draw very little current. They can controllably and repeatably attenuate the light transmitted to output waveguide 150 by a desired amount.

The small size of the reflecting surface in a semiconductor micro-electro-mechanical device 116 results in a low moment of inertia. Thus, only a small force is needed to pivot the reflecting surface 116. For example, in a variable optical attenuator according to the exemplary embodiment of the invention, the DMD pivots the reflecting surface sufficiently to produce 25 dB of attenuation using a power source of about five volts. By way of comparison, a prior art optical switch described in U.S. Pat. No. 4,498,730 (with reference to FIG. 5 thereof) uses a voltage of 134 volts to actuate the switch between a light conducting state and a non-conducting state.

A conventional piezoelectric element 112 may be used to provide a controlled variable angle to the reflecting surface 116, with a rapid response.

A control circuit 160 is provided to control the position of the reflecting surface 116. For example, the control may be implemented using a custom printed circuit to generate a control signal corresponding to any desired attenuation. Alternatively, the control circuit may be provided by a conventional embedded processor or micro controller with computer program code. The code may include, for example, a look-up table specifying the correspondence between the required attenuation and the control signal applied to the DMD 110 to produce the corresponding angle for the required attenuation.

For some applications, variable attenuation may be provided using a three-position reflecting surface 116, with the variable attenuation provided by pulse width modulation (PWM). A three-position DMD has three stable states: flat, down-left, and down right. For the attenuator application, the flat position is used to provide the "normal, non-attenuating" reflecting surface. (In prior art applications of DMD's for displays, the flat position is typically not used.) Either the down-left or the down-right position results in more than enough deflection of the mirror 116 to cause substantial attenuation (more than 40 dB).

Figure 3:
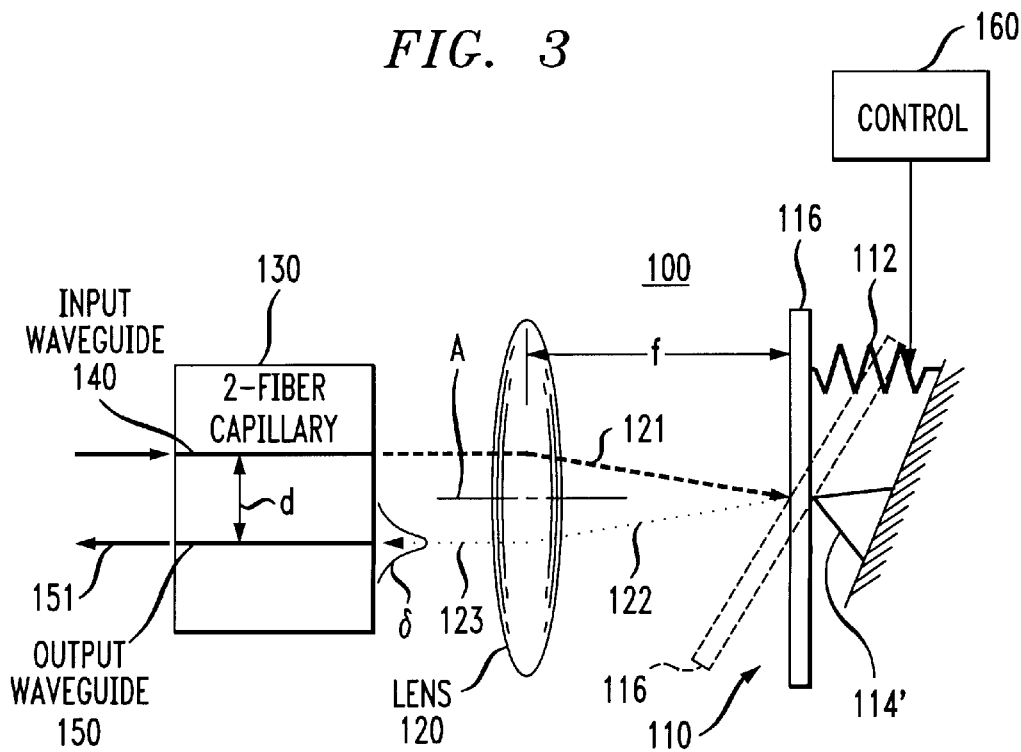
FIG. 3 shows a of the optical attenuator of FIG. 1 in a non-attenuating state, and an attenuating position (shown in phantom).

FIG. 3 shows a variation of the exemplary embodiment of FIG. 1. In this variation, the flat (unenergised) position of the DMD is not used. The DMD is mounted with its support 114 at an angle less than 90 degrees from the axis A of the lens 120. In the down-left position of the reflecting surface 116, light 123 is transmitted to waveguide 150 with low loss. In the down-right position (shown in phantom), the reflecting surface is canted so that light is substantially attenuated.

Rather than vary the attenuation by using a respectively different angle for each level of attenuation, the variation of FIG. 3 uses pulse width modulation (PWM). PWM techniques are well known in automatic controls. Although the reflected light in the normal (flat) position always has the same intensity, integration of the transmitted light signal 151 can provide a desired average amount of attenuation. The precision of the attenuation is determined by the number of bits used to encode the duty cycle of the mirror's on time. As few as two different signal levels (in this case, zero attenuation and an attenuation value of at least 40 dB) may be used. The integrated (or average) amount of light which is transmitted by the output waveguide depends on the percentage of the total time in which the device is in the zero attenuation position, and the percentage of the total time in which the device is in the attenuation position. The latter fraction is the "duty cycle."

An advantage of using PWM is that the precision of the control is not limited by the number of positions into which the DMD can be placed. The number of bits used to represent the duty cycle and the speed of switching the DMD are the controlling factors. By increasing the number of bits used to control the switching, the precision can be improved, to the limit allowed by the switching rate of the DMD.

One of ordinary skill in the art of fabricating DMD's could readily construct a two-position DMD having only a single down position (either down-left or down-right), wherein the mirror is constrained to only pivot between the flat position and the single down position. It may be easier to control the flat-position inclination of the reflecting surface in a two-position configuration.

Figure 4:
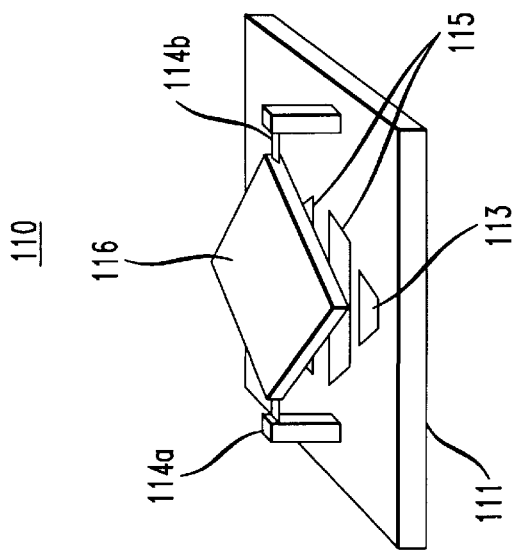
FIG. 4 shows a first exemplary semiconductor micro-electro-mechanical device suitable for use in the attenuator of FIG. 1.

FIG. 4 is an isometric view of an exemplary DMD 110 having an electrostatic element. The DMD 110 is positioned on a substrate 111, which may be silicon. The reflecting surface 116 may be a square mirror of about 16 μm, pivotally mounted to a pivoting pin or torsion hinge 114b having two supports 114a. An electrostatic charge is applied to electrode 113 to pivot the mirror 116 to the deflected position, where it remains until the charge is removed. An address electrode 115 allows selection of a DMD from a plurality of DMD'S, in the case where a plurality of similar attenuators are used.

If PWM is used, then the control circuit 160 adjusts the duty cycle of the DMD based on the attenuation desired.

Figure 5:
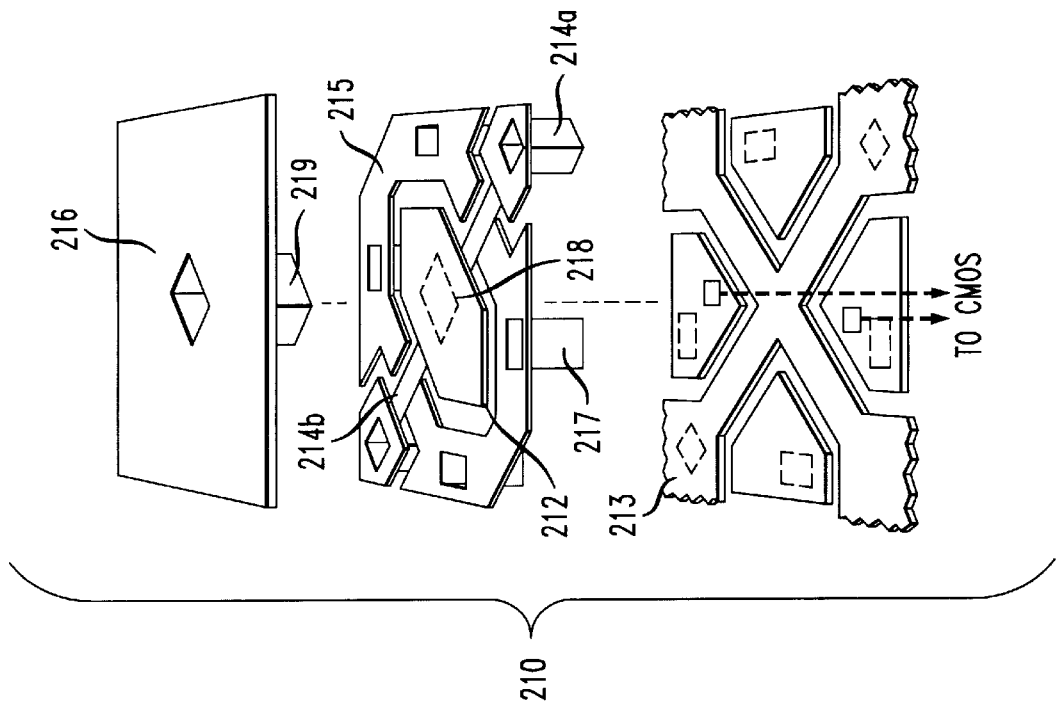
FIG. 5 shows second exemplary semiconductor micro-electro-mechanical device suitable for use in the attenuator of FIG. 1.

FIG. 5 is an isometric view of a further exemplary DMD 210 having an electrostatic element. The DMD 210 of FIG. 5 differs from the DMD 110 of FIG. 4 in that DMD 210 has a pivoting platform 212 on which the reflecting mirror 216 is mounted. Mirror 216 is supported above platform 212 by a post 219 which is seated on a yoke 218. The pivoting platform 212 is controlled by application of a charge to electrode 213, in a manner similar to that used in DMD 110. An address electrode 215 is provided to select one of a plurality of DMD's 210. The pivot pin 214b is pivotally mounted to supports 214a, and the address electrode is pivotally mounted to supports 217.

Functionally, DMD 210 is similar to DMD 110, but the configuration shown in FIG. 4 may occupy a smaller footprint for a given mirror size.

Although the exemplary embodiments use silicon technology, it is contemplated that other semiconductor technologies, such as GaAs may also be used, as such technologies become readily available.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. A variable optical attenuator, comprising:

a lens;

first and second optical waveguides; and a semiconductor micro-electro-mechanical device positioned on a side of the lens opposite the first and second optical waveguides, the device having a reflecting surface, the reflecting surface having a normal position in which light from the first waveguide reflects off of the reflecting surface and passes through the lens into the second waveguide, the reflecting surface having a plurality of respectively different attenuating positions in which light from the first waveguide reflects off of the reflecting surface and passes through the lens, but an amount of light entering the second optical waveguide is attenuated by respectively different amounts corresponding to the respectively different positions, wherein the first and second optical waveguides are positioned so that 40 dB of attenuation are produced by pivoting the reflecting surface about 0.35 degrees or less from the normal position.

2. A variable optical attenuator according to claim 1, wherein the semiconductor micro-electro-mechanical device is one of the group consisting of a digital micromirror device and a silicon micro-electro-mechanical system.

3. A variable optical attenuator according to claim 1, wherein the semiconductor micro-electro-mechanical device is a digital micromirror device (DMD) including one of the group consisting of a piezoelectric element and an electrostatic element, for pivoting the reflecting surface.

4. A variable optical attenuator, comprising:

a lens;

first and second optical waveguides; and a semiconductor micro-electro-mechanical device positioned on a side of the lens opposite the first and second optical waveguides, the device having a reflecting surface, the reflecting surface having a normal position in which light from the first waveguide reflects off of the reflecting surface and passes through the lens into the second waveguide, the reflecting surface having a plurality of respectively different attenuating positions in which light from the first waveguide reflects off of the reflecting surface and passes through the lens, but an amount of light entering the second optical waveguide is attenuated by respectively different amounts corresponding to the respectively different positions, wherein the first and second optical waveguides are positioned so that 20 dB of attenuation are produced by pivoting the reflecting surface about 0.1 degree from the normal position.

5. A variable optical attenuator, comprising:

a lens;

first and second optical waveguides; and a semiconductor micro-electro-mechanical device positioned on a side of the lens opposite the first and second optical waveguides, the device having a reflecting surface, the reflecting surface having a normal position in which light from the first waveguide reflects off of the reflecting surface and passes through the lens into the second waveguide, the reflecting surface having a plurality of respectively different attenuating positions in which light from the first waveguide reflects off of the reflecting surface and passes through the lens, but an amount of light entering the second optical waveguide is attenuated by respectively different amounts corresponding to the respectively different positions, wherein the micro-electro-mechanical device pivots the reflecting surface sufficiently to produce 25 dB of attenuation using a power source of about five volts.

6. A variable optical attenuator, comprising:

a lens;

means for transmitting light to the lens means for receiving light from the lens;

a reflecting surface; and pivoting means for pivotally supporting the reflecting surface, and for pivoting the reflecting surface to:
  a normal position in which light from the transmitting means reflects off of the reflecting surface and passes through the lens into the receiving means, and
  a plurality of respectively different attenuating positions in which light from the transmitting means reflects off of the reflecting surface and passes through the lens, but an amount of light entering the receiving means is attenuated by respectively different amounts corresponding to the respectively different positions, wherein, the first and second optical waveguides are positionable in one of the group consisting of:
  a first position in which 40 dB of attenuation are produced by pivoting the reflecting surface about 0.35 degrees or less from the normal position, and
  a second position in which 20 dB of attenuation are produced by pivoting the reflecting surface about 0.1 degree from the normal position.

7. A variable optical attenuator according to claim 6, wherein the pivoting means is a silicon micro-electro-mechanical device.

8. A variable optical attenuator according to claim 6, wherein the transmitting and receiving means are optical fibers.

9. A variable optical attenuator, comprising:

a lens;

first and second optical waveguides;

a semiconductor micro-electro-mechanical device positioned on a side of the lens opposite the first and second optical waveguides, the device having a reflecting surface,
  the reflecting surface having a normal position in which light from the first waveguide reflects off of the reflecting surface and passes through the lens into the second waveguide,
  the reflecting surface having an attenuating position in which light from the first waveguide reflects off of the reflecting surface and passes through the lens, but an amount of light entering the second optical waveguide is attenuated; and a controller that controls a duty cycle of switching the reflecting surface between the reflecting position and the attenuating position, thereby to control an average amount of light entering the second waveguide.

10. A variable optical attenuator according to claim 9, wherein the semiconductor micro-electro-mechanical device is a digital micromirror device.

11. A method for controlling a beam of light, comprising the steps of:
  (a) providing a lens, first and second optical waveguides, and a semiconductor micro-electro-mechanical device positioned on a side of the lens opposite the first and second optical waveguides, the device having a reflecting surface;
  (b) pivoting the reflecting surface to a normal position in which light from the first waveguide reflects off of the reflecting surface and passes through the lens into the second waveguide; and
  (c) pivoting the reflecting surface to a plurality of respectively different attenuating positions in which light from the first waveguide reflects off of the reflecting surface and passes through the lens, but an amount of light entering the second optical waveguide is attenuated by respectively different amounts corresponding to the respectively different positions, including pivoting the reflecting surface about 0.35 degrees or less from the normal position to achieve 40 dB of attenuation relative to the normal position.

12. A method for controlling a beam of light, comprising the steps of:
  (a) providing a lens, first and second optical waveguides, and a semiconductor micro-electro-mechanical device positioned on a side of the lens opposite the first and second optical waveguides, the device having a reflecting surface;
  (b) pivoting the reflecting surface to a normal position in which light from the first waveguide reflects off of the reflecting surface and passes through the lens into the second waveguide; and
  (c) pivoting the reflecting surface to a plurality of respectively different attenuating positions in which light from the first waveguide reflects off of the reflecting surface and passes through the lens, but an amount of light entering the second optical waveguide is attenuated by respectively different amounts corresponding to the respectively different positions, including pivoting the reflecting surface about 0.1 degree or less from the normal position to achieve 20 dB of attenuation relative to the normal position.

13. A method for controlling a beam of light, comprising the steps of:
  (a) providing a lens, first and second optical waveguides, and a semiconductor micro-electro-mechanical device positioned on a side of the lens opposite the first and second optical waveguides, the device having a reflecting surface;
  (b) pivoting the reflecting surface to a normal position in which light from the first waveguide reflects off of the reflecting surface and passes through the lens into the second waveguide; and
  (c) pivoting the reflecting surface to a plurality of respectively different attenuating positions in which light from the first waveguide reflects off of the reflecting surface and passes through the lens, but an amount of light entering the second optical waveguide is attenuated by respectively different amounts corresponding to the respectively different positions, including applying a potential of about five volts to the semiconductor micro-electro-mechanical device to pivot the reflecting surface sufficiently to produce 25 dB of attenuation.

* * * * *